Figures 1, 2:
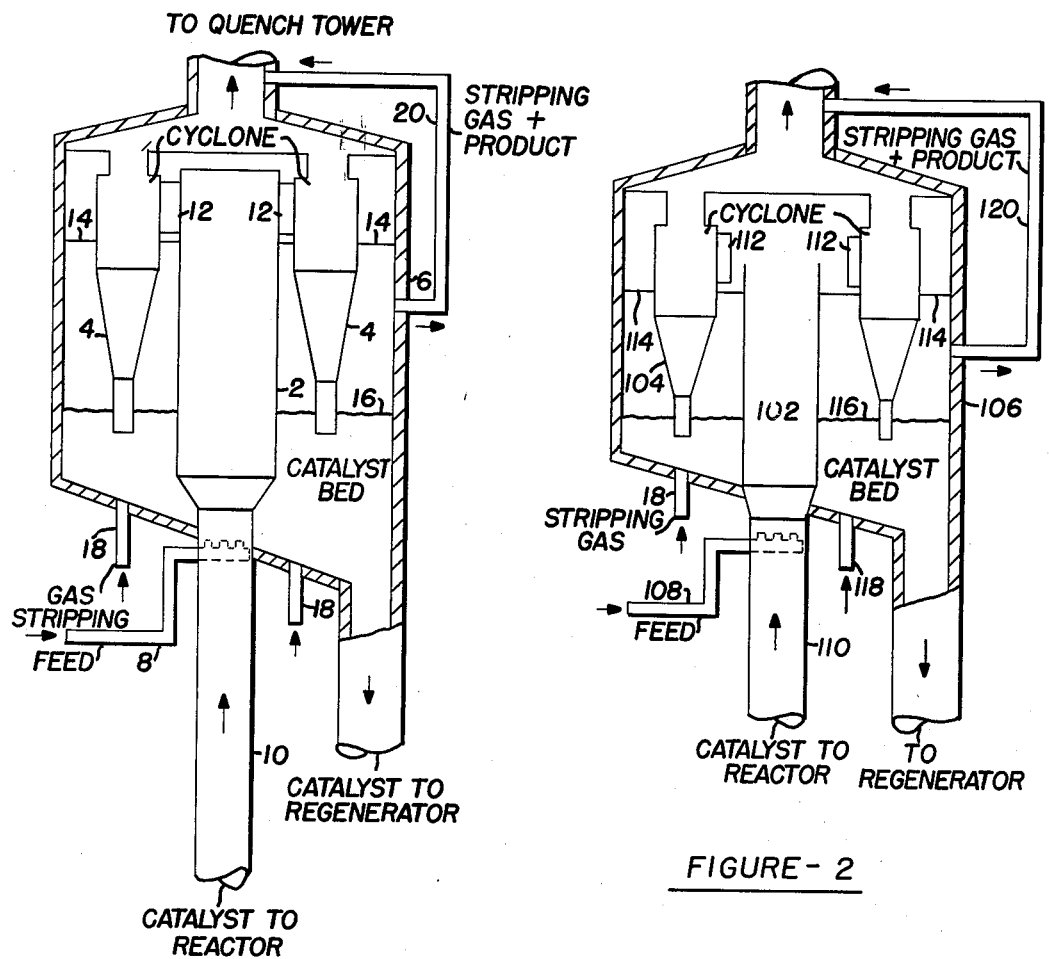

Nov. 1, 1955 H. E. W. BURNSIDE ET AL 2,722,476
VACUUM-TYPE TRANSFER LINE REACTOR
Filed April 16, 1954

Harvey E. W. Burnside
Daniel S. Maisel    Inventors
Donald W. Wood
By *Henry Berk* Attorney

United States Patent Office 2,722,476
Patented Nov. 1, 1955

2,722,476

VACUUM-TYPE TRANSFER LINE REACTOR

Harvey E. W. Burnside, Locust-Rumson, Daniel S. Maisel, Union, and Donald W. Wood, Highland Park, N. J., assignors to Esso Research and Engineering Company, a corporation of Delaware Application April 16, 1954, Serial No. 423,598

2 Claims. (Cl. 23—288)

The present invention relates to apparatus for carrying out reactions by contacting finely divided solids with gaseous fluids. More particularly, the present invention relates to apparatus adapted to separate finely divided solids from the gas-solid dispersions employed in petroleum refining and petrochemical processes. Still more particularly, the present invention relates to equipment adapted to effect the above separation so as to reduce greatly the contact time of the vaporous reaction products and the solids stream following the reaction.

Processing equipment employing fluidized masses are now widely employed in petroleum and petrochemical processing. The catalyst and vaporous reaction products are usually withdrawn from the reaction zone and the finely divided solids separated from the reaction products by the centrifugal action induced in one or more cyclone separators.

Many petroleum and petrochemical processing operations involving contact of gases or vapors with catalytic or non-catalytic solids are carried out by the now well-known fluidized solids technique wherein the reactant gases pass upwardly through a dense, fluidized bed of finely divided solids at atmospheric or superatmospheric pressures. A uniform contact time is thus maintained, and thereafter the reaction products and entrained solids are separated in cyclone separators. Certain reactions, particularly those wherein contact time between reactants and catalyst should be maintained at a minimum, are more advantageously carried out in a transfer line reactor. In such a system, the catalyst, maintained at a critical, controlled reaction temperature, is carried as a dilute phase in suspension concurrently with a stream of reactant vapor through a narrow reaction zone for a uniform short period, and then is abruptly disengaged. Hydrocarbon oxidation and dehydrogenation reactions are particularly adapted to this type of processing. In particular, the catalytic dehydrogenation of n-butane or n-butenes to butadiene, isobutane to isobutylene or pentanes or pentenes to isoprene are carried out advantageously in a transfer line reactor, and furthermore, especially for the case of diolefin production such a reactor is preferably operated under vacuum. Dilution with steam for reduction of hydrocarbon partial pressure cannot be used in paraffin dehydrogenation to a diolefin since effective catalysts known at this time are deactivated by the presence of steam.

In the catalytic vacuum dehydrogenation of n-butane to butadiene in a transfer line reactor, the catalyst and product vapors are separated in cyclones. However, since the reaction is carried out at low pressures, in the order of 100 to 400 mm. Hg, numerous conventional cyclones in parallel are required to handle the large vapor volume. It is necessary in operations of this type to enclose the cyclones in a separate vessel. If an enclosure were not used, the erosion of a hole in one of the cyclones would cause a plant shutdown. In conventional cyclone installations, to avoid expensive manifolding and piping, the vapor-catalyst stream is usually fed to the vessel where it seeks its own path through the cyclones. This technique, however, is unsatisfactory in operations wherein a minimum contact time of catalyst and reaction product is desired, such as in the catalytic dehydrogenation of butane to butadiene. This reaction is highly endothermic, and the catalyst is heated to 1150–1450° F. to supply the heat of dehydrogenation. However, at these high temperatures, the butadiene initially produced is readily decomposed, and for this reason it is essential to remove the catalyst from the reaction product as soon as the reaction is completed and to cool the reaction mixture before appreciable diolefin loss occurs. However, passage of the product stream to the conventional cyclone separator vessel described above, where it seeks its own path through the cyclones is a highly unsatisfactory technique, for the vapor residence time above the catalyst bed in such a vessel would be very large compared to the reaction time and would be sufficient to cause undesirable thermal cracking reactions to take place. For example a reaction time of about one-half second is desired for butadiene production. A conventional cyclone installation might give a minimum of three–six seconds residence time at a reaction temperature. This is clearly impractical. It is undesirable and impractical, however, to quench both the vaporous reaction mixture and the catalyst particles and thereafter separate the former from the latter. Heat balance calculations show that it would involve almost a 10-fold increase in total heat requirement for the solids have to be reheated to regeneration temperatures and to supply the sensible heat for the dehydrogenation reaction.

It is an object of the present invention to furnish equipment, and particularly a transfer line reactor and cyclone separator arrangement, which will provide a minimum vapor residence time before the reaction products are quenched, which will minimize piping and manifolding costs, in which will also permit plant operation to proceed even if holes are eroded in one or more cyclones. With this and other objects in view as may appear from the accompanying description, the invention consists of various features of construction and combination of parts which will be described in connection with the accompanying drawings in which preferred embodiments of the invention are illustrated. The vapor residence times achieved by this construction are 0.1–1 second in the reaction zone and 0.1–0.5 second in the solids separation zone.

Figure 1 is an illustration of a preferred embodiment of the present invention and Figure 2 is an illustration of a modified embodiment.

Turning now to Figure 1, there is shown in combination transfer line reactor vessel 2 and a plurality of cyclone separators 4, only two of which appear in the drawing. The reactor is a short vertical conduit of relatively narrow cross-section and, together with the cyclone separators, is located entirely within housing on vessel 6. Hydrocarbon feed is passed to the reactor through line 8 while the heated catalyst, either fresh or regenerated, is passed upwardly through duct 10. Passage of the regenerated catalyst from the regenerator (not shown) to the reactor is made possible by the difference in pressures existing in the two zones, the regenerator or burner vessel being maintained at atmospheric pressure whereas the reactor vessel is maintained under vacuum and by the use of inert gas injection at various points along the riser. A good catalyst for the process is one comprising chromia and alumina.

In accordance with the embodiment of the invention shown in Figure 1, the hot spent dehydrogenation catalyst is disengaged abruptly from the vaporous product stream in the cyclone separator system shown. A series of cyclone separators 4, numbering from four to eight or nine, are arranged about the circumference of reactor 2 with entrance ducts 12 at or near the top of the reactor. The cyclones are supported and separated from the large free space in vessel 6 by a plate 14 which extends across housing 6, which encloses both reactor 2 and cyclones 4. If this plate were not used, the residence time and subsequent thermal cracking of any vapors coming from a hole in one of the cyclones would be appreciable, due to the large free space available above the bed. However, a tight seal between plate 14 and cyclones 4, and between plate 14 and reactor 2 is not necessary because of the gas stripping in the lower chamber which is removing small amounts of product carried into the catalyst bed 16 from the cyclones. For this purpose, stripping gas is introduced through conduits 18. The major part of this stripping gas is removed through conduit 20 and is combined with product vapor from the cyclones. Any gas leakage around plate 14 and into the upper portion of vessel 6 can thus exit into the manifold at the top of the vessel through a cyclone (not shown) located in the upper portion whose entrance duct opens into the free space and not into the top of reactor 2. This cyclone also removes solids from any vapor blowing through an eroded hole in one of the other cyclones.

It should also be pointed out that the construction minimizes thermal stresses since there need be no fixed connection between the reactor and the cyclone systems. The cyclones can be suspended from the upper section of the vessel (6) while the reactor is fixed to the lower part of this vessel. The cyclone may also be supported by plate 14 which in turn need not be fastened firmly to the reactor.

In Figure 2, there is shown another embodiment of the present invention. In this case, the vapor-catalyst stream leaving the open end of reactor 102 discharges into the upper chamber of vessel 106 and seeks its own path through cyclones 104 arranged around the circumference of reactor 102.

It is to be understood that this transfer line reactor and cyclone arrangement may be employed advantageously not only in the specific embodiment detailed above but also equally well in other processes where it is necessary to minimize, before quenching of the reaction product vapors, the vapor residence time of the vapor-catalyst stream leaving the reactor, and at the same time use numerous cyclone separators for solids removal with a minimum investment for piping and manifolding.

What is claimed is:
1. Apparatus for rapid separation of finely-divided solids from gaseous carrier fluids comprising in combination a housing, a transfer line reactor of relatively narrow cross section disposed within said housing, a plurality of cyclonic separators spaced about the circumference of said reactor and having inlets in open communication with said reactor, a plate adapted to support said separators and extending horizontally across said housing, said plate being disposed below the inlets of said cyclonic separators, whereby said housing is divided into an upper chamber and a lower chamber, said lower chamber being relatively large compared with said upper chamber, conduit means for discharging solids from said separators into said lower chamber, conduit means in said lower chamber for admitting and withdrawing stripping gas, and conduit means for withdrawing gaseous fluids substantially completely free from solid particles.

2. Apparatus for rapid separation of finely-divided solid material from gaseous carrier material comprising in combination a housing, a transfer line reactor of relatively narrow cross section vertically disposed within said housing, a plurality of cyclonic separators spaced about the circumference of said reactor and disposed within said housing, conduit means for passing said finely-divided solids and gaseous carrier from said reactor to said separators, said conduits extending to and being in open communication with the upper portion of said reactor, a plate adapted to support said cyclones and extending across said housing, said plate being horizontally disposed below said conduit means and serving to divide said housing into relatively small upper and a relatively large lower chamber, conduit means for discharging solids from said separators into said lower chamber, conduit means in the lower chamber for admitting and withdrawing stripping gas, and conduit means adapted to withdraw gaseous carrier material from said separators.

References Cited in the file of this patent

UNITED STATES PATENTS

| | | |
|---|---|---|
| 2,410,284 | Gunness et al. | Oct. 29, 1946 |
| 2,436,464 | Van Dornick | Feb. 24, 1948 |
| 2,604,479 | Rollman | July 22, 1952 |
| 2,640,844 | McGrath et al. | June 2, 1953 |